US011931984B2

(12) United States Patent
Lamkemeyer

(10) Patent No.: US 11,931,984 B2
(45) Date of Patent: Mar. 19, 2024

(54) PROCESS FOR MANUFACTURING BAGS

(75) Inventor: Andreas Lamkemeyer, Georgsmarienhuette (DE)

(73) Assignee: WINDMOELLER & HOELSCHER KG, Lengerich (DE)

( * ) Notice: Subject to any disclaimer, the term of this patent is extended or adjusted under 35 U.S.C. 154(b) by 140 days.

(21) Appl. No.: 12/588,602

(22) Filed: Oct. 21, 2009

(65) Prior Publication Data

US 2010/0120595 A1 May 13, 2010

(30) Foreign Application Priority Data

Oct. 24, 2008 (DE) ..................... 10 2008 053 032.8

(51) Int. Cl.

*B31B 70/62* (2017.01)
*B31B 70/00* (2017.01)
*B31B 150/00* (2017.01)
*B31B 160/10* (2017.01)
*B31B 160/20* (2017.01)

(52) U.S. Cl.

CPC .............. *B31B 70/62* (2017.08); *B31B 70/00* (2017.08); *B31B 2150/00* (2017.08); *B31B 2160/10* (2017.08); *B31B 2160/20* (2017.08)

(58) Field of Classification Search

CPC . B31B 70/00; B31B 2150/00; B31B 2160/20; B31B 70/62; B31B 2160/10
USPC ....... 493/243, 264, 218, 219, 221, 331, 334; 156/578
See application file for complete search history.

(56) References Cited

U.S. PATENT DOCUMENTS

| | | | | | |
|---|---|---|---|---|---|
| 4,026,237 | A | * | 5/1977 | Flanagan | 118/696 |
| 4,095,554 | A | * | 6/1978 | Moen | 118/711 |
| 4,157,149 | A | * | 6/1979 | Moen | 222/486 |
| 4,714,647 | A | * | 12/1987 | Shipp, Jr. | B01D 39/163 156/167 |
| 4,874,451 | A | * | 10/1989 | Boger et al. | 156/291 |
| 4,939,678 | A | * | 7/1990 | Beckwith, Jr. | G01B 11/306 33/1 M |
| 5,048,809 | A | * | 9/1991 | Tebbe et al. | 270/45 |
| 5,188,695 | A | * | 2/1993 | Colton | B65B 51/023 118/684 |

(Continued)

FOREIGN PATENT DOCUMENTS

| | | |
|---|---|---|
| DE | 30 20 043 | 12/1981 |
| DE | 90 14 548 | 1/1991 |

(Continued)

*Primary Examiner* — Sameh Tawfik
(74) *Attorney, Agent, or Firm* — Jacobson Holman PLLC

(57) ABSTRACT

An apparatus for production of sacks from semi-finished sacks, preferably tube pieces, with which sacks of different format can be produced has at least one device for the folding of sack bottoms and at least one gluing station for the gluing of at least the bottom flaps of an opened bottom square of the sack bottoms. The gluing station has at least two application heads. Each application head has a glue application area, whose extent is variable in a spatial direction (y), and is movable relative to a bottom center line of the sacks. A maximum glue application area in the spatial direction (y) has a length that is shorter than a spacing (C) located on one side of a bottom center line between an outer edge of the bottom flap of the largest sack format gluable in the gluing station and the center line of the sack.

10 Claims, 3 Drawing Sheets

(56) References Cited

U.S. PATENT DOCUMENTS

| | | | | |
|---|---|---|---|---|
| 5,660,316 | A * | 8/1997 | Magni | H01L 21/67144 228/1.1 |
| 5,876,502 | A * | 3/1999 | Sugimura et al. | 118/712 |
| 6,142,923 | A * | 11/2000 | Bakoledis | 493/243 |
| 6,342,264 | B1 * | 1/2002 | Raterman et al. | 427/8 |
| 6,457,608 | B1 * | 10/2002 | Riney | B05C 5/0279 222/135 |
| 6,805,660 | B1 * | 10/2004 | Finch | 493/218 |
| 6,955,722 | B2 * | 10/2005 | Ackerman | 118/315 |
| 7,618,360 | B2 | 11/2009 | Daher et al. | |
| 7,762,449 | B2 * | 7/2010 | Cheng | B23K 20/004 228/180.5 |
| 7,832,183 | B2 * | 11/2010 | Jacob | B65B 7/20 53/207 |
| 2002/0020768 | A1 * | 2/2002 | Held et al. | 239/562 |

FOREIGN PATENT DOCUMENTS

| | | |
|---|---|---|
| EP | 1 648 688 | 4/2006 |
| WO | WO 2005/002837 A1 | 1/2005 |

* cited by examiner

PROCESS FOR MANUFACTURING BAGS

CROSS-REFERENCE TO RELATED APPLICATION

This application has a priority of German no. 10 2008 053 032.8 filed Oct. 24, 2008, hereby incorporated by reference.

BACKGROUND OF THE INVENTION

1. Field of Invention

The invention concerns an apparatus for production of sacks for paper sacks as described herein, and a gluing device associated therewith.

2. Description of the Prior Art

Apparatuses of this type are used to produce a variety of sacks. These sacks include so-called valve sacks, in which valve slips are generally inserted during production of the bottom. The bottoms themselves are often configured as cross-bottoms, as shown, for example, in DE 090 145 48 U1 and DE 3020043 A1. In order to impart permanent integrity to the bottoms and inserted valve slips, parts of the bottoms are glued to each other and/or to the valve slips by means of glue.

For this purpose, either the areas of the bottom folds being glued or the slips assigned to them, i.e., all the areas to be glued to each other, are provided with a glue application and then glued to each other by bringing them together or folding.

Glue application according to format generally occurs by bringing a format part fastened to a rotating roll into contact with a glue roll or other glue reservoir or transfer parts during one revolution of the roll and then applying the glue. With further revolution of the roll, the format plate transfers the glue stored on it to the areas of the later sack bottoms or slips being glued. For this purpose, the format part is provided with characteristic elevations, which are adjusted to a specific sack format. To produce sacks with other formats, the format parts are replaced on the bottom laying device. This type of glue application has proven itself, since large amounts of difficult to handle starch glue can be applied cleanly and according to format.

"Glue application according to format" is understood here to mean a form of application adjusted to the type and format of the sack. Application within this form of application generally occurs superficially, in which special significance of durability and tightness of the sacks is often assigned to the edges of the form.

However, a shortcoming is that for these devices a number of glue transfer components, for example, format rolls and format parts, must be kept on hand and must also be cleaned again after use.

Bottom-laying devices have therefore recently become known, which get by without such format parts. Thus, EP 1 648 688 B1 shows a bottom-laying device with a gluing station, in which several application heads extrude glue onto semi-finished sacks. For this purpose, several glue valves are mounted on each of these application heads. These glue valves are assigned to one or more glue outlet openings, from which glue is applied to the sack components.

Producing glue application according to format now occurs by selectively controlling a control unit of these glue valves. In this way, a wide variety of glue profiles can be implemented and the need to keep a large number of format parts on hand drops out.

The longest possible or maximum application area of such an application head in such a device is the application area obtained when all glue valves are opened. Since this application area, in most gluing stations, lies across the transport direction of the sacks, maximum application width is often also spoken of. In the present document, however, words related to "length" of the application area are used (for example, shorter, longer), in order to initially leave open only its alignment to the transport direction.

Since all the components of the application head (which generally also include the already mentioned glue valves) are expensive, the advantages of such a gluing device free of format parts in a bottom laying device, however, stand in contrast to the significant acquisition costs.

SUMMARY OF THE INVENTION

The task of the present invention is therefore to further modify the bottom-laying device according to EP 1 648 688 B1, so that its production costs can be reduced.

This task is solved according to the invention as described herein.

The starting point of the invention is therefore a bottom-laying device, which produces sacks or bags of different format. Semi-finished bags, like tube pieces, are generally used for production as raw material.

Such bottom-laying devices have devices for folding the sack bottoms, the complexity of which cannot be underestimated, since cross-bottoms are generally folded. The folded bottoms are then fed to gluing stations for gluing, at least of the bottom flap of the opened bottom square of the sack bottom.

Glue tracks of different dimension can be applied in the aforementioned fashion with the gluing station at least to the bottom flaps of the sacks, in order to be able to efficiently produce different sack or bag formats.

The gluing station should be equipped with at least one, but better several application heads (see EP 1 648 688 B1). The glue is extruded onto the sack components by the application heads.

At least one application head should have a glue application area, whose extent can be varied in a spatial direction. This change, as shown in EP 1 648 688 B1, can occur by nozzle wiring or "selection" of the corresponding glue outlet openings. However, it is also possible to operate with a wide slit nozzle and, in so doing, by varying the length of the wide slit. The mixture of both instructions for glue application (with a wide slit nozzle and valves) is also conceivable.

As mentioned, the spatial direction in which the change in length of the application area occurs is generally at right angles to the transport direction of the sacks in the gluing station. For these reasons, the term "application width" or "width of the application area" is often used. However, other arrangements of the application area are also possible.

At least one of the application heads should be movable in the corresponding spatial direction relative to the other application heads.

If the maximum application area of at least one application head in one spatial direction is smaller than the distance that is obtained on one side of the bottom center line between the outer edge of the bottom flap of the largest sack format gluable in the gluing station (with length of the flap equal to the bottom width) and the center line of the sack, areas of the sack bottom of sacks with maximum sack format are without the possibility of being simultaneously glued. Any reduction in maximum application area of an application head, however, entails a significant reduction in manufacturing costs. In particular, the relative mobility of at least one application head, however, provides the aforementioned saving possibility. A further advantage, however, is the reduction in length of the application area in one spatial direction to a length that is smaller than the spacing, which is obtained on one side of the bottom center line between the outer edge of the bottom flap of the largest sack format gluable in the gluing station and the bottom center line of the sack and larger than or equal to the spacing, which is obtained on one side of the bottom center line between the outer edge of the bottom flap of the largest sack format gluable in the gluing station and the crease line of the largest sack format gluing in the gluing station.

It has been found that no application area is required on one side of the center line of the sack, whose length is greater than the spacing obtained on one side of the bottom center line between the outer edge of the bottom flap of the largest sack format gluable in the gluing station and the crease line of the smallest sack format gluable in the gluing station.

The relative movability of at least one application area does one more thing.

Additional cost savings are possible, if the length of the application area is reduced to amounts that lie in the area of half the spacing obtained on one side of the bottom center line between the outer edge of the bottom flap of the largest sack format gluable in the gluing station and the crease line of the largest sack format gluable in the gluing station.

This spacing corresponds to the width of the cover sheet (in sacks, in which the width of the cover sheet corresponds to the bottom width, which thus far has been assumed). If the width of both cover sheets is reduced below the bottom width, the sack material is saved. The stability of the sack, however, remains, especially in an appropriate range, if a bottom corner sheet (for purposes of the document, also named under the general term "slip") is used for fastening of the bottom, and if an overlap occurs between the outer edges 31, 32 of the bottom flaps. This condition ends when the bottom cover sheets have a smaller width than half the bottom width of the corresponding sack.

It can therefore be advantageous to configure the application area of at least one application head greater than or equal to half the bottom width of the smallest sack format.

In application heads equipped with a number of glue outlet openings, it is recommended, at least in an edge area of the application area of the application head, to provide more active glue valves per length unit than in other areas of the glue application head. Those areas of the application head that have their work areas in the region of the crease line or outer end areas of the bottom flap are understood to be the edge areas. Through this expedient, finer adjustment of the dimensions of the applied glue tracks can be made. The "resolution" of application width can therefore be increased in this way. The described measures in both end areas of the at least one application head are advantageous (for the outer edge area of the bottom flap and for the crease track). Greater benefits, however, are offered by such an end area in a work position relative to the crease track of the sacks (inner area of the application head), since the corresponding valve can be used both in small and large glue formats.

With reference to advantageous lengths of the application areas of at least one application head, it should also be mentioned in this context that a length of the application head that deviates slightly in one spatial direction from the spacing, which is obtained on one side of the bottom center line between the outer edge of the bottom flap of the largest sack format gluable in the gluing station and the crease line of the smallest sack format gluable in the gluing station, is advantageous.

In particular, spacings that lie in the area of the spacing between two adjacent glue outlet openings (spacing in a spatial direction generally at right angles to the sack transport direction) are advantageous here. This spacing can be a normal spacing between two adjacent glue outlet openings or a reduced spacing in the edge area.

It generally applies for all lengths of the application areas shown and claimed as advantageous in this document that slight deviations from them (and especially deviations by the amount of the spacing of the glue application openings) are advantageous.

Gluing stations with two application heads according to the invention are advantageous.

Older sacks production apparatuses ("bottom layers") can also be advantageously retrofitted with gluing stations that have the aforementioned properties.

Further practical examples of the invention are apparent from the object description and the claims.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

Figure 1:
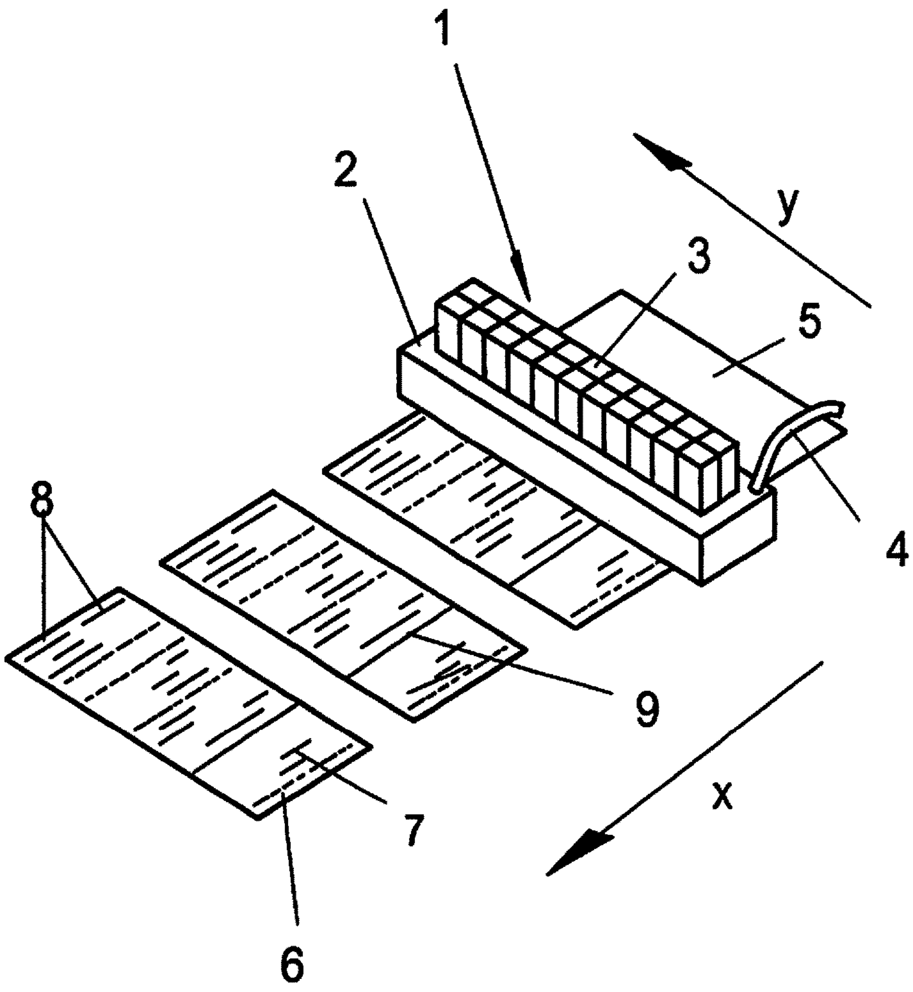
FIG. 1 an individual application head provided for the gluing station in the bottom laying device according to the invention FIG. 2 a sketch of folded up bottom squares FIG. 3 sketch of folded up bottom squares that are guided to a gluing station FIG. 4 a sketch of sack transport in a bottom-laying apparatus FIG. 5 a sketch of the side of an application plate facing the sacks

FIG. 1 shows an application head 1, as used in a gluing station in the bottom-laying device according to the invention. This application head 1 consists of an application plate 2, on which valves 3 are mounted. The glue is fed to the application head 1 via glue feed line 4. Unglued slips 5 are fed to the glue station in direction x.

One or a group of glue outlet openings is assigned to each valve 3 in the side of the application plate 2 facing the unglued slips 5. Glue flow to the glue outlet opening can be produced or interrupted by the assigned valve 3. In this way, it is possible to apply to the unglued slips 5 different glue tracks that run parallel to the feed direction x of the unglued slips 5. By regular opening and closing of valve 3, a regularly interrupted glue track 6 can be applied. Short glue tracks 7, interrupted glue tracks 8 and continuous glue tracks 9 can also be produced.

If an unglued slip 5 is not situated beneath application head 1, glue flow through all valves 3 is interrupted, so as not to needlessly soil the gluing station. In order to be able to glue all areas of the unglued slips in direction y across the feed direction, the application head 1 is also movable in this direction. The application head 1 just described, however, can be used not only for gluing of slips 5, but is also suitable, because of variability of the glue tracks that can be produced, for glue application on the areas of the later sack bottom being glued. The last-mentioned type of application of such application heads is prominent in the present document.

Figure 2:
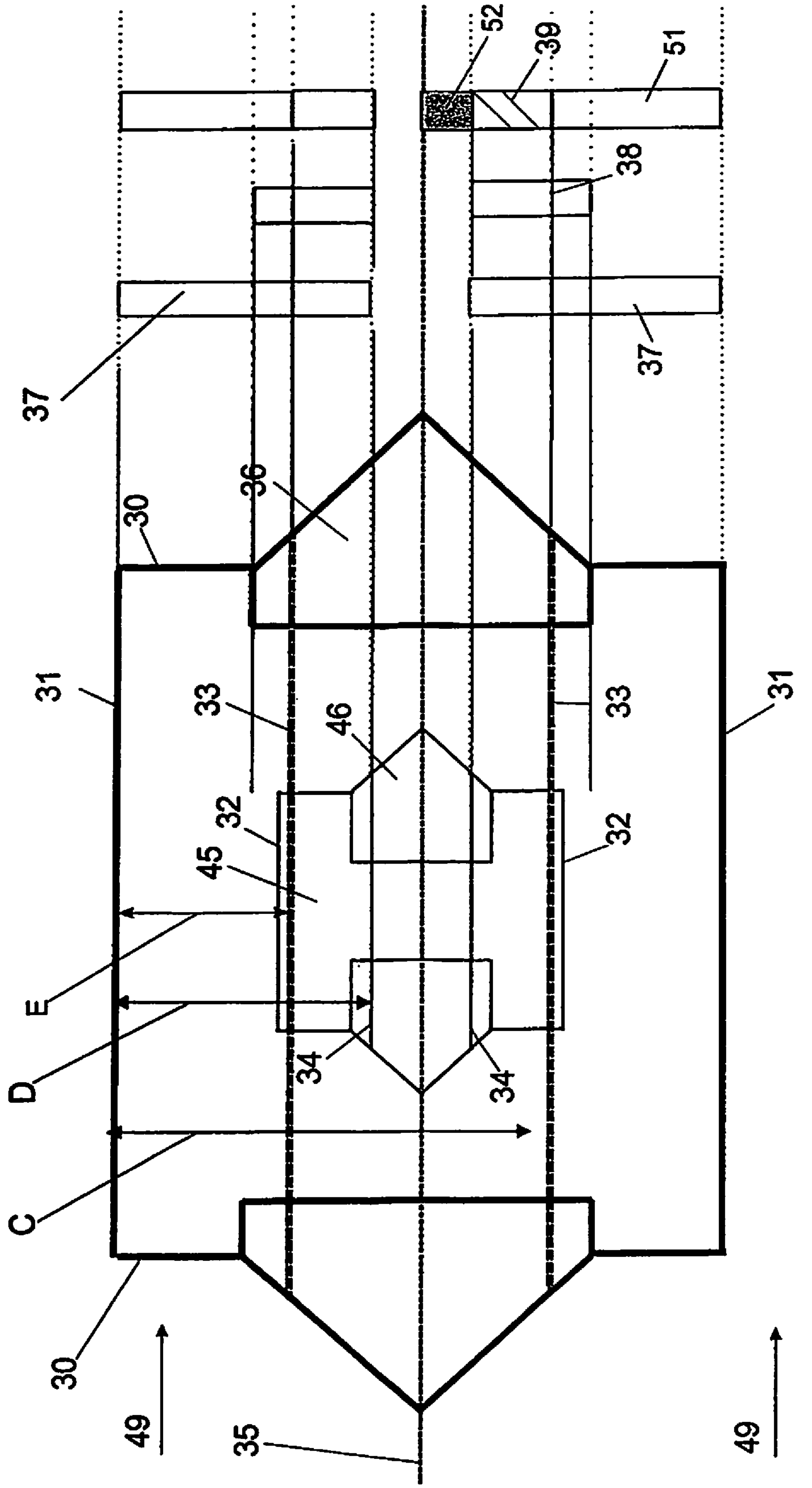

FIG. 2 shows the folded up bottom squares of the largest 30 and smallest 45 sack format, which can be glued with a gluing station.

Both in the figures showing the folded up bottom squares and in the dimension details in the claims, it is initially assumed that the width of the bottom flaps corresponds to the width of the sack bottoms. The exceptions are mentioned.

The contours of the largest sack format 30 are depicted with thicker lines than those of the smallest sack format 45. For the largest sack format 30, the outer edges of the bottom flaps 31, the crease lines 33 and the triangular pockets 36 are provided with reference numbers. Overall, however, all depicted contours are familiar in their significance to one skilled in the art, since cross-bottoms (for example, of cement sacks) have had these contours for decades in the folded up state.

The same applies for contours of the smallest bottom square 45: the outer edges of the bottom flaps 32, the crease lines 34 and the triangular pockets 46 are again provided with reference numbers.

The two depicted bottom squares 30 and 45 are aligned relative to each other, so that they have the same bottom center line 35. This corresponds to the transport situation of the sacks or sack components in most modern devices for production of sacks:

The sacks in these devices, during part of sack production, are transported with the bottom square folded out. Sacks of different format, which are produced for processing different orders on the same device (offset in time), are often conveyed along the same bottom center line 35, in which the tube elements 47 are in the collapsed state.

Figure 4:
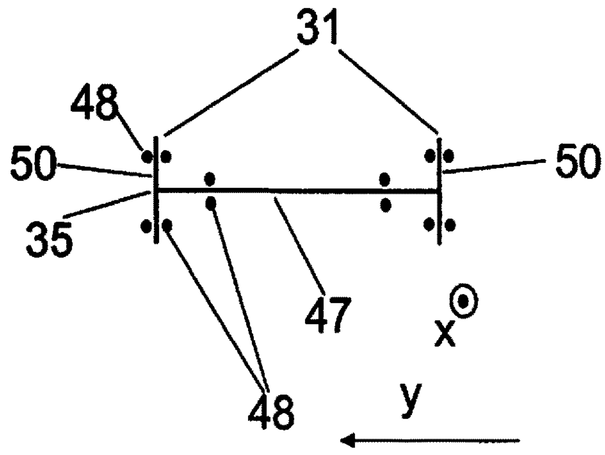

This transport situation is shown in FIG. 4 from a viewing angle represented by arrow 49: the tube in many modern bottom-laying devices is transported by any transport means 48, which hold the tube elements 47 (collapsed) and the bottom flaps 50 in this transport situation. Belts, rollers and plates are generally used as transport devices.

Bars can be seen in FIG. 2 to the right next to the bottom square 30, 45. The first bar 37 symbolizes an application area, whose length corresponds to the spacing D between the crease line 34 of the smallest sack format and the outer edge of the largest sack format 31 on one side of the bottom center line 35. The length of the bar 38 corresponds to the spacing of crease line 34 of the smallest sack format, which can be produced in the corresponding gluing station or bottom layer and the outer edge 32 of the bottom flap of the smallest sack format.

The spacing C is the spacing between the bottom center line 35 and the outer edge 31 of a bottom flap of the largest sack format 30. The spacing E is the spacing between the crease line 33 and the outer edge 31 of a bottom flap of the largest sack format (generally equal to the bottom width of the largest sack format). The total length of bar 51 is the entire area that can be covered in a gluing station on one side of the bottom center line during gluing with glue when the application heads have either a correspondingly wide application area or are movable in this area. The present document also proposes application heads having a maximum application area of smaller length than that of bar 51.

Section 52 of bar 51 is the spacing between the bottom center line 35 and the crease line 34 of the smallest sack format 45.

Section 39 of bar 51 corresponds to the length of the application area, which is to be saved when the application area of at least one application head 3, 40 has only a length that corresponds to the spacing between the crease line 33 and the outer edge 31 of the bottom flap of the largest sack format and not to the spacing between the outer edge 31 of the bottom flap of the largest sack format and the crease line 34 of the smallest sack format (area that must be provided with glue). As already mentioned above, the corresponding application head should also be movable relative to the application head or the other application heads or relative to the bottom center line in bottom-layers with a fixed bottom center line.

The area between the crease line of the smallest possible sack format and the outer edge of the bottom flap of the largest possible sack area is the smallest area, on which glue application must be possible during production of the different possible sack formats (on one side of the bottom center line). The present document proposes advantageous devices for sack production of gluing, having application heads with application lengths that are shorter than this area.

Figure 3:
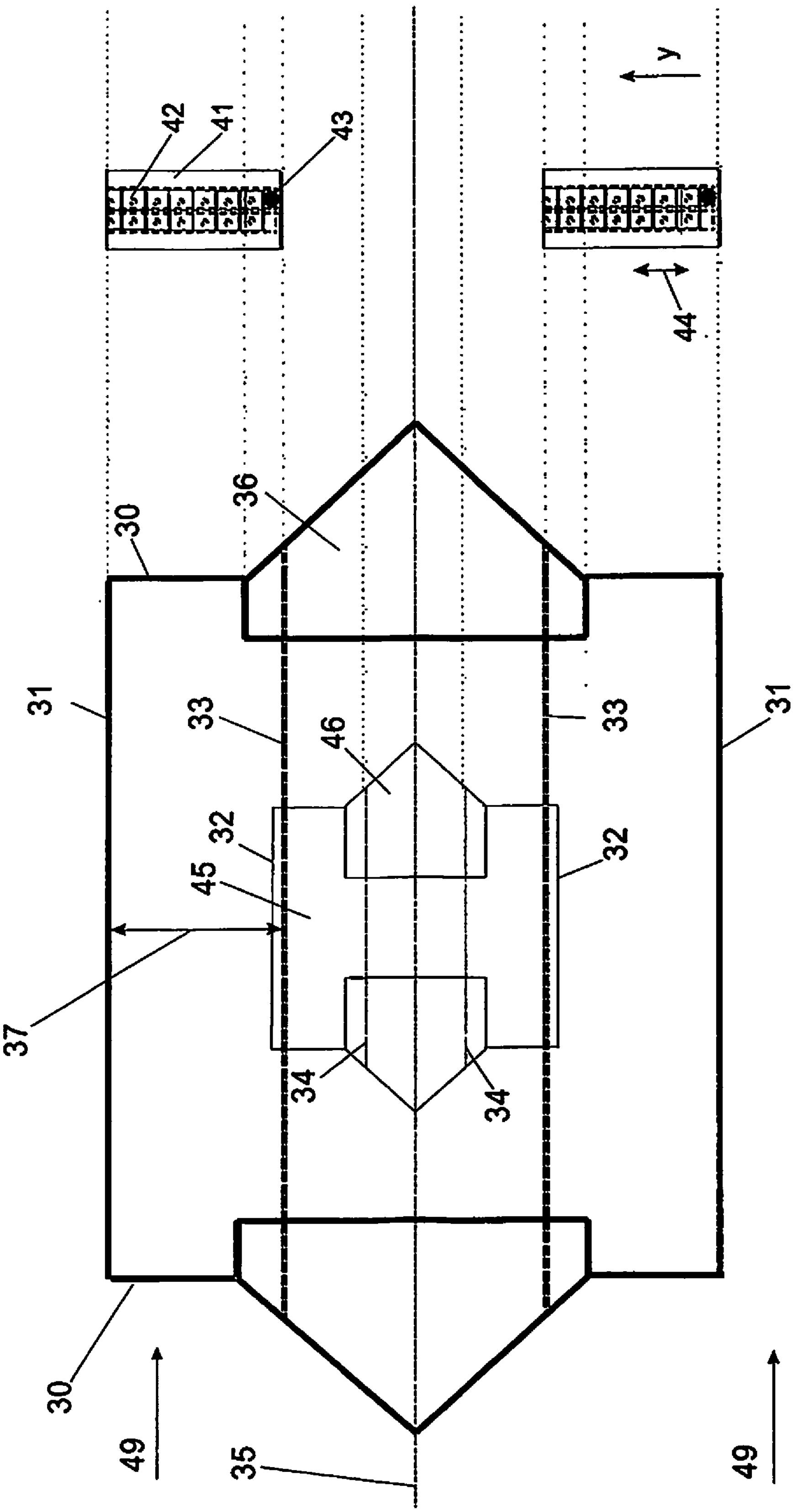

FIG. 3 again shows the bottom squares 30 and 45 depicted in FIG. 2. On the right edge of the figure, however, instead of the bar, the two application heads 40 with the two application plates 41 are shown. By means of arrows x and y, which represent the transport direction of the sacks and a spatial direction at right angles to it, it is symbolized that the sacks are transported into the work area of the application heads 40. Transport can occur in the manner sketched in FIG. 4. It should not be overlooked that at least one of the application heads should be movable in the y-direction, which is shown by the double arrow 44. Mobility of both heads offers advantages here. In a preferred variant, both application heads 40 should be movable relative to bottom center line 35.

The application heads carry glue valves 42, 43. In this context, a glue valve is a component that can open and close a glue line. Glue valves 42, 43 of this type generally have one or more glue outlet openings 50, 51, which extrude glue onto the bag on the side facing away from the viewer.

It is advantageous to provide at least one “additional” valve 43 in the end areas of the application areas of the application heads (FIG. 4). An additional valve 43 means that the number of valves active for gluing per length unit lies higher in this area than (for example) in the center of the application heads.

Figure 5:
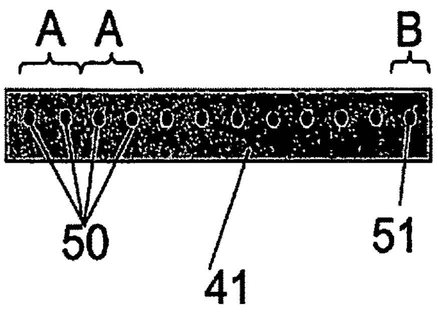

With this expedient, the number of glue valves 42, 43 active per length unit (of the application area) can be increased in a certain length section of the application area of an application head 40. A smaller number of glue outlet lines and therefore a smaller length section b, in which the glue flow through the valve is critical, can then be assigned to the additional glue valves 43 (FIG. 5). If this occurs at least in an edge area of the application area of the application head 40, the "resolution", with which different glue formats can be adjusted, can be increased from A (normal application area of a valve) to B (reduced application area of an "additional" valve).

FIG. 5 again shows this circumstance. The side of an application plate 41 facing the sacks is shown here. It cannot be seen that two of the normal glue application openings 50 are assigned to a normal glue valve 42, i.e., receive their glue via this glue valve 42. An active application area of such a normal glue valve is therefore produced, as shown by the brackets A. It covers two normal glue application openings 50. An additional glue valve 43 (FIG. 3) is exclusively assigned to the additional glue application opening 51. The wiring of this additional glue valve 43 therefore only leads to a variation in length of the glue application area by B. B only covers a glue application opening and is therefore half as long as A when all glue application openings have the same spacing to each other.

The depicted measures are advantageous in both end areas of the application area.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of reference numbers | |
|---|---|
| 1 | Application head |
| 2 | Application plate |
| 3 | Valve |
| 4 | Glue feed line |
| 5 | Unglued slip |
| 6 | Regularly interrupted glue track |
| 7 | Short glue track |
| 8 | Interrupted glue track |
| 9 | Continuous glue track |
| 30 | Folded up bottom square of the largest sack format |
| 31 | Outer edge of the bottom flap of the largest sack format |
| 32 | Outer edge of the bottom flap of the smallest sack format |
| 33 | Crease line of the largest sack format |
| 34 | Crease line of the smallest sack format |
| 35 | Bottom center line |
| 36 | Triangular pocket of the largest sack format |
| 37 | Application area 1 |
| 38 | Application area 2 |
| 39 | Saved area |
| 40 | Application head |
| 41 | Application plate |
| 42 | Normal glue valve |
| 43 | Additional glue valve |
| 44 | Double-arrow (indicates mobility of the application head 40) |
| 45 | Folded up bottom square of the smallest sack format |
| 46 | Triangular pocket of the largest sack format |
| 47 | Tube element |
| 48 | Transport device |
| 49 | Arrows in the viewing direction of the view of FIG. 4 |
| 50 | "Normal" glue outlet openings |
| 51 | "Additional" glue outlet openings |
| 52 | Spacing between bottom center line 35 and crease line 34 (smaller sack format) |
| X | Transport direction of sacks |
| y | Spatial direction (across transport direction x) |
| A | Application area of a normal glue valve 42 |
| B | Application area of an additional glue valve 43 |
| C | Spacing between 31 and 35 |
| D | Spacing between 31 and 34 |
| E | Spacing between 31 and 33 |

What is claimed is:

1. An apparatus for production of sacks from semi-finished sacks, with which sacks of different format can be produced, said apparatus comprising:

at least one device that folds sack bottoms; and at least one gluing station that provides a glue to at least bottom flaps of an opened bottom square of the sack bottoms, the at least one gluing station applying glue tracks of different dimensions at least on the bottom flaps, and including at least two application heads each having a glue application area whose extent is variable in a spatial direction (y), which is orthogonal to a feed direction of the sack bottoms, and each of the at least two application heads being movable in the spatial direction (y) relative to a bottom center line of the sacks, the at least two movable application heads having a maximum application area, in the spatial direction (y), defined by for a smallest sack format gluable in the gluing station, a length of the application head maximum application area that is less than or equal to a spacing (D) located on one side of a bottom center line between an outer edge of the bottom flap of a largest sack format gluable in the gluing station and a crease line, the crease line being located, in the spatial direction (y), outward of the bottom center line of the bottom of the sack, and for the largest sack format gluable in the gluing station, a length of the application head maximum application area that is greater than or equal to a spacing (E) located on the one side of the bottom center line between the outer edge of the bottom flap of the largest sack format gluable in the gluing station and the crease line, the crease line being located, in the spatial direction (y), outward of the bottom center line of the bottom of the sack, with the at least two movable application heads each including (i) a plurality of first glue valves, each of the first glue valves each having two glue application openings, which together provide a first glue application area, and (ii) a single second glue valve disposed at one end of the movable application head, the second glue valve having only one glue application opening, which provides a second glue application area that is smaller than the first glue application area, the single second glue valve thereby being configured to provide in the crease line area of the sacks, increased resolution of glue application in the second glue application area relative to the resolution provided by the two glue application openings of the first glue application area.

2. The apparatus according to claim 1, wherein the length associated with the maximum application area is greater than or equal to half of the spacing (E).

3. The apparatus according to claim 1, wherein the at least two application heads each have glue outlet openings which are selectively supplied with glue through valves, in which a format of glue application is defined by selecting the valves that are to be open, and wherein the at least one edge of the maximum application area of the at least two application heads has more active valves that are activatable for the glue application than another area of an application area of the at least two application heads.

4. The apparatus according to claim 3, wherein the length associated with the maximum application area differs from the spacing (E) by a spacing (a) of two of the glue openings on the application heads.

5. The apparatus according to claim 3, wherein the length associated with the maximum application area differs from the spacing (E) by an active application area (a, b) of the glue valve.

6. The apparatus according to claim 1, wherein the semi-finished sacks are tube pieces.

7. The apparatus according to claim 1, wherein the increased resolution of glue application by the application head in the second glue application area is characterized by a more accurate adjustment of dimensions of the applied glue track.

8. A gluing station for providing a glue to at least bottom flaps of an opened bottom square of bottoms of sacks with glue tracks of different dimensions, said gluing station comprising:

at least two application heads each having a glue application area whose extent is variable in a spatial direction (y), which is orthogonal to a feed direction of the sack bottoms, and each of the at least two application heads being movable in the spatial direction (y) relative to a bottom center line of the sacks, the at least two application heads having a maximum application area, in the spatial direction (y), defined by for a smallest sack format gluable in the gluing station, a length of the application head maximum application area that is less than or equal to a spacing (D) located on one side of a bottom center line between an outer edge of the bottom flap of a largest sack format gluable in the gluing station and a crease line, the crease line being located, in the spatial direction (y), outward of the bottom center line of the bottom of the sack, and for the largest sack format gluable in the gluing station, a length of the application head maximum application area that is greater than or equal to a spacing (E) located on the one side of the bottom center line between the outer edge of the bottom flap of the largest sack format gluable in the gluing station and the crease line, the crease line being located, in the spatial direction (y), outward of the bottom center line of the bottom of the sack, with the at least two movable application heads each including (i) a plurality of first glue valves, each of the first glue valves each having two glue application openings, which together provide a first glue application area, and (ii) a single second glue valve disposed at one end of the movable application head, the second glue valve having only one glue application opening, which provides a second glue application area that is smaller than the first glue application area, the single second glue valve thereby being configured to provide in the crease line area of the sacks, increased resolution of glue application in the second glue application area relative to the resolution provided by the two glue application openings of the first glue application area.

9. An apparatus for production of sacks from semi-finished sacks, with which sacks of different format can be produced, said apparatus comprising:

at least one device that folds sack bottoms; and at least one gluing station that provides a glue to at least bottom flaps of an opened bottom square of the sack bottoms, the at least one gluing station (i) applying glue tracks of different dimensions at least on the bottom flaps, and (ii) including at least two application heads each having a glue application area whose extent is variable in a spatial direction (y), each being movable relative to a bottom center line of the sacks, and each having a plurality of glue valves each having associated therewith a plurality of glue openings, the at least two application heads having a maximum application area, in the spatial direction (y), defined by for a smallest sack format gluable in the gluing station, a length of the application head maximum application area that is less than or equal to a spacing (D) located on one side of a bottom center line between an outer edge of the bottom flap of a largest sack format gluable in the gluing station and a crease line, the crease line being located, in the spatial direction (y), outward of the bottom center line of the bottom of the sack, and for the largest sack format gluable in the gluing station, a length of the application head maximum application area that is greater than or equal to a spacing (E) located on the one side of the bottom center line between the outer edge of the bottom flap of the largest sack format gluable in the gluing station and the crease line, the crease line being located, in the spatial direction (y), outward of the center line of the bottom of the sack, and the at least two application heads each having at an end thereof a single glue valve having associated therewith a corresponding single glue opening, the single glue valve with the corresponding single glue opening thereby being configured to provide at the end of the application head, which services the crease line area of the sacks, an increased number of glue valves per unit length of the application head relative to the number of glue valves in a portion of the application head having the plurality of glue valves each having associated therewith a plurality of glue openings.

10. The apparatus according to claim 9, wherein the single glue valve and the corresponding single glue opening provide a reduced glue application area relative to each glue application area associated with the plurality of glue valves each having associated therewith the plurality of glue openings.

* * * * *